United States Patent [19]

Sadler

[11] Patent Number: 5,214,733
[45] Date of Patent: May 25, 1993

[54] DUCT FOR RECEIVING AN OPTICAL FIBRE MEMBER

[75] Inventor: Alan A. Sadler, Cheshire, England

[73] Assignees: BICC PLC, London; Corning Limited, Sunderland, both of England

[21] Appl. No.: 690,154

[22] Filed: Apr. 23, 1991

[30] Foreign Application Priority Data

Apr. 24, 1990 [GB] United Kingdom ............... 9009176

[51] Int. Cl.$^5$ ................................................. G02B 6/44
[52] U.S. Cl. ...................................... 385/109; 385/101; 138/177
[58] Field of Search ............... 350/96.20, 96.21, 96.22, 350/96.23; 138/177, 108, 121, 138, 173; 385/109, 101, 102, 103, 104, 105, 125

[56] References Cited

U.S. PATENT DOCUMENTS

| H704 | 11/1989 | Di Vita et al. | 350/96.23 |
|---|---|---|---|
| 4,529,009 | 7/1985 | Horner et al. | 138/111 |
| 4,688,890 | 8/1987 | DeMeo et al. | 350/96.23 |
| 4,892,442 | 1/1990 | Shoffner | 405/154 |
| 4,952,021 | 8/1990 | Aoki et al. | 385/109 |
| 5,027,864 | 7/1991 | Conti et al. | 350/96.23 X |
| 5,046,815 | 9/1991 | Cain et al. | 385/109 |

FOREIGN PATENT DOCUMENTS

| 0456909A2 | 11/1991 | European Pat. Off. . |
|---|---|---|
| 645785 | 11/1950 | United Kingdom . |
| 1032851 | 6/1966 | United Kingdom . |
| 1131142 | 10/1968 | United Kingdom . |
| 1261122 | 1/1972 | United Kingdom . |
| 2135136 | 8/1984 | United Kingdom . |
| 2156837A | 10/1985 | United Kingdom . |
| WO90/00823 | 1/1990 | World Int. Prop. O. . |

*Primary Examiner*—Akm E. Ullah
*Assistant Examiner*—Phan Thi Heartney
*Attorney, Agent, or Firm*—Darby & Darby

[57] ABSTRACT

A duct is provided for receiving an optical fibre member by blowing. The duct is formed at least in part of a plastics material which is electrically conductive or has electrically conductive material such as carbon black held therein or has an electrically conductive material applied thereto preferably the duct has a radially inner layer defining an inside wall of the duct and at least one further layer positioned outwardly of the inner layer, the inner layer being formed of the plastics material which is electrically conductive or has electrically conductive material held therein or had an electrically conductive material applied thereto.

8 Claims, No Drawings

DUCT FOR RECEIVING AN OPTICAL FIBRE MEMBER

FIELD OF THE INVENTION

This invention relates to a duct for receiving an optical fibre member The term "optical fibre member" is used herein to cover both members which contain a single optical fibre and members which contain a plurality of optical fibres, and it is to be understood that the duct described herein can be used to receive either a single optical fibre member or a plurality of optical fibre members, and in the latter case the plurality of optical fibre members may be installed simultaneously or successively.

BACKGROUND OF THE INVENTION

The present invention is more particrlarly concerned with a duct in which one or more optical fibre members are to be installed using a flowing fluid. Such a technique is described, for example, in EP-A-108590, and is referred to for convenience herein as the installation of optical fibre members by blowing. It is to be understood, however, that the flow of installation fluid, which is preferably air or some other suitable gas, could be produced by sucking, either in addition to, or instead of, blowing.

The ducts hitherto used for the installation of fibres by blowing have been made of plastics materials. It has been found that during the installation of an optical fibre member by blowing, a static electrical charge builds up on the inside wall of the duct, which then attracts the optical fibre member and impedes its progress. This is a variable phenomenon, depending on the particular combination of materials and on environmental conditions. Given time, the static charge will dissipate itself, but it is not normally practical to stop the installation process, perhaps several times, to allow this to happen.

Mobile additives have been incorporated in the duct material with a view to reducing friction between the optical fibre members and the duct. Ihese do in fact help to dissipate static electrical charge, though they were not proposed for this purpose. However, they are by no means ideal for this purpose. For one thing, the way these additives work is that they migrate to the surface of the duct, and this takes time. Furthermore, once there they are gradually removed by abrasion and other effects, such as washing, and so the effect of the additive in dissipating static electrical charge is gradually reduced. Also, the effectiveness of these additives can depend on the amount of atmospheric humidity.

Attention is also directed to WO90/00823 which proposes a duct having two concentric layers, the inner layer comprising, for example carbon doped high density polyethylene. Although proposed for the purpose of reducing friction between the optical fibre members and the duct the electrical conductivity of the carbon does in fact help to dissipate static electrical charge. This effect is not disclosed in WO90/00823.

BRIEF SUMMARY OF THE INVENTION

According to the present invention there is provided a duct for receiving an optical fibre member, which duct is formed at least in part of a plastics material which is electrically conductive or has electrically conductive material held therein or applied thereto.

The invention further provides a duct for receiving an optical fibre member, which duct has a radially inner layer defining an inside wall of the duct and at least one further layer positioned outwardly of the said inner layer, the inner layer being formed of a plastics material which is electrically conductive or has electrically conductive material held therein or applied thereto.

The invention yet further provides a method of manufacturing the duct as defined in the preceding paragraph, in which the inner layer, and the further layer or at least one of the further layers, are produced by co-extrusion.

The invention also provides a method cf installing an optical fibre member, in which the optical fibre member is installed by a flowing fluid in a duct according to the invention.

DETAILED DESCRIPTION OF PREFERRED EMBODIMENTS

In choosing a conductive material for the duct it is desirable that it should have a high conductivity and a short charge decay time. Charge decay time may be measured by one of a number of standard tests. Two of these are referred to below. The first is a British Standard (BS 2782, Part 2, Method 250A: 1976 "Antistatic behaviour of film: charge decay method"), which measures the time taken for the charge on a surface to fall to half its initial value. The second is a U.S. standard (Federal Test Method 101-4046, in which the time is measured for the potential on a surface to fall from 5kV to 50 volts. Preferably, the conductive material used in the present invention should have a charge decay time, as measured by BS 2782, of not more than 10 seconds, more preferably not more than 1 second, and most preferably not more than 0.1 second. As measured by the above U.S. standard, the corresponding times are approximately seven times as long as those measured by BS 2782.

Carbon black may be used as the electrically conductive material referred to above as being held in a plastics material. The particles of carbon black preferably have a high surface area:volume ratio. The carbon black is preferably present in an amount of at least 2%, more preferably at least 10%, by weight, based on the total weight of plastics material and carbon black. The amount of carbon black may be as much as 50% or even more. Alternatively, metallic particles can be used (e.g. aluminium flakes or particles of Zelec, a material described below), electrically conductive fibres (e.g. chopped carbon fibres), or chopped metallic wire, (e.g. copper wire). If desired, longer lengths of such fibre or wire can be incorporated in addition.

The plastics material is preferably a high density polyethylene, though a low or medium density polyethylene may alternatively be used, or polypropylene, for example.

Where a plastics material is used which is itself conductive this may comprise, for example, a material selected from the following: polyaniline, polyacetylene, polypyrole, polyphthalocyanine and polythiophene. The conductive plastics material may be used alone or blended with a non-conductive plastics material, for example polyethylene or polypropylene.

In the case of a two-layer duct, the outer layer may, for example be formed from a mineral-filled thermoplastic sold as MEGOLON S300 by Lindsay and Williams Ltd of Ogden Lane Works, Columbine St., Manchester, England. Alternative materials for the outer layer include carbon grade polyethylene and metal. The use of a two-layer duct makes it possible to select for the inner layer a material which has optimum properties for blowing, e.g. a low coefficient of friction, a smooth surface finish and a substantial ability to dissipate static electricity, whilst having an outer layer which has the desired properties in terms of mechanical strength, resistance to environmental attack, fire resistance, external diameter, burst strength and so forth. If all the desired properties for the outer layer cannot be achieved using a single material it may be preferred to have a plurality of layers outside the inner layer, instead of just a single outer layer.

A typical two-layer duct has an internal diameter of 3.5 mm, an inner layer having a wall thickness of 0.15 mm and an outer layer having an external diameter of 5.0 mm. More generally, the internal diameter of the duct is preferably from 1 mm to 10 mm.

The two-layer duct can be produced by simultaneously extruding the two layers through concentric annular dies, and causing the two layers to unite before they solidify. An alternative possibility is to line a non-conductive plastics duct with a conductive film. One such film is a polyester film which has been rendered conductive by coating it with a material sold under the name of Zelec ECP-S by E.I. du Pont de Nemours & Co. of Wilmington, Delaware, U.S.A., Zelec ACP-S is available as a powder in which particles of a chemically inert material, for example silica, titanium dioxide or mica, are coated with antimony-doped tin oxide. The coated film has a typical surface resistance of $1.6 \times 10^6$ ohms/square and a typical charge decay time of 0.01 seconds, as measured by Federal Test Method 101-4046.

Another conductive film which can be used is a plastics/aluminium laminate. Yet another possibility is to coat a plastics duct internally with a metal film.

Examples of ducts according to the invention will now be given:

EXAMPLE 1

The duct consists of two layers. The inner layer is formed of high density polyethylene having carbon black dispersed therein. One suitable material is that formed from a resin sold as CABELEC 3172 and available from Cabot Plastics Limited of Gate Street, Dukinfield, Cheshire, England. The outer layer of the duct is formed from a mineral-filled thermoplastic sold as MEGOLON S300 by Lindsay and Williams Ltd of Ogden Lane Works, Columbine St, Manchester, England. CABELEC 3172 has a typical volume resistivity of $10^3$ ohm. cm, and a typical surface resistivity of 10 ohms/sq. The duct has an internal diameter of 3.5 mm, the inner layer is 0.15 mm thick, and the external diameter of the outer layer is 5.0 mm.

EXAMPLE 2

This duct is the same as that of Example 1 except that instead of CABELEC 3172 the resin used is PE 2573, also available from Cabot Plastics Limited. This consists of carbon black dispersed in low density polyethylene. It has a typical volume resistivity of $10^2$ ohm.cm.

EXAMPLE 3

A duct of the same internal and external diameters as in Examples 1 and 2 is formed using a polyethylene/aluminium laminate to provide electrical conductivity. The film comprises a layer of aluminium 0.15 mm thick laminated to a layer of polyethylene 0.04 mm thick. The laminate is formed into a tube with the aluminium layer on the inside, and as the tube is formed it is oversheathed with polyethylene from an extruder to give a duct of the desired dimensions. Equipment for forming a film into a tube and oversheathing it with extrude plastics material is well known in the cable-making industry and is therefore not described further here.

EXAMPLE 4

A duct is formed by the same method as in Example 3, but using a Zelec-coated polyester film, as described above, in place of the polyethylene/aluminium laminate.

I claim:

1. A duct for receiving an optical fibre member, which duct is formed at least in part of a plastics material which is electrically conductive or has electrically conductive material which is free of lubricating grade carbon and held therein or applied thereto.

2. A duct as claimed in claim 1, having a radially inner layer defining an inside wall of the duct and at least one further layer positioned outwardly of the said inner layer, the inner layer being formed of the plastics material which is electrically conductive or has electrically conductive material held therein or applied thereto.

3. A duct as claimed in claim 2, wherein the said layers are co-extruded layers.

4. A duct according to claim 1, wherein the duct is formed at least in part of a plastics material which has, as the electically conductive material held therein, a material selected from the group consisting of metallic particles, electrically conductive fibres, for example chopped carbon fibres, and chopped metallic wire, for example copper wire.

5. A duct according to claim 1, wherein the duct is formed at least in part of a plastics material which is electrically conductive and which is polyaniline.

6. A duct according to claim 1, which comprises polyethylene or polypropylene.

7. A method of installing an optical fibre member, in which the optical fibre member is installed by a flowing fluid in a duct which is formed at least in part of a plastics material which is electrically conductive or has electrically conductive material which is free of lubricating grade carbon and held therein or applied thereto.

8. A method of installing an optical fibre member, in which the optical fibre member is installed by a flowing fluid in a duct which is formed at least in part of a plastics material which is electrically conductive or has electrically conductive material which is free of carbon and held therein or applied thereto.

* * * * *